United States Patent [19]
Latta, Jr.

[11] 4,290,047
[45] Sep. 15, 1981

[54] LIGHT DETECTION, SIGNALING AND SPEED MEASUREMENT SYSTEM

[76] Inventor: John S. Latta, Jr., 3100 W. Walnut, Apt. 109, Garland, Tex. 75040

[21] Appl. No.: 934,704

[22] Filed: Aug. 21, 1978

Related U.S. Application Data

[63] Continuation-in-part of Ser. No. 669,677, Mar. 23, 1976, Pat. No. 4,117,457.

[51] Int. Cl.³ .......................... B62J 5/00; H05B 37/02
[52] U.S. Cl. .................................. 340/134; 315/149; 324/160; 324/175; 356/28
[58] Field of Search .................. 340/134, 52 R, 52 H, 340/84, 87, 31 C, 38 P, 34; 324/160, 175, 166; 180/167, 169; 315/149, 155, 200 A; 364/565, 566; 356/4, 28

[56] References Cited

U.S. PATENT DOCUMENTS

| 3,026,498 | 3/1962 | Galliers | 340/34 |
|---|---|---|---|
| 3,516,751 | 6/1970 | Fruensel | 356/4 |
| 3,576,371 | 4/1971 | Ulicki | 356/4 |
| 3,892,483 | 7/1975 | Säufferer | 340/34 |
| 3,901,813 | 8/1975 | Potopinski | 250/209 |
| 3,953,126 | 4/1976 | Kim et al. | 356/28 |
| 3,989,980 | 11/1976 | Berman | 315/158 |
| 4,117,457 | 9/1978 | Latta | 340/134 |
| 4,151,466 | 4/1979 | Boyer et al. | 324/160 |
| 4,156,190 | 5/1979 | Chittenden et al. | 324/175 |

Primary Examiner—John W. Caldwell, Sr.
Assistant Examiner—Donnie Lee Crosland
Attorney, Agent, or Firm—Richards, Harris & Medlock

[57] ABSTRACT

A light detection, signaling and speed measurement system. The system includes a housing having a first photosensitive surface mounted therein for detection of an incident light source approaching the system from any direction. The system further includes at least one light signal device mounted for visibility, along with circuitry responsive to detection of the incident light source for illuminating the light signal device. A second photosensitive surface is also provided to receive largely ambient light and to be nonresponsive to the light of the incident light source, along with circuitry to allow the illumination of the light signal device only when the second photosensitive surface detects the absence of a predetermined level of ambient light. The system further includes circuitry for detecting and indicating the velocity of the incident light source moving with respect to the system.

35 Claims, 14 Drawing Figures

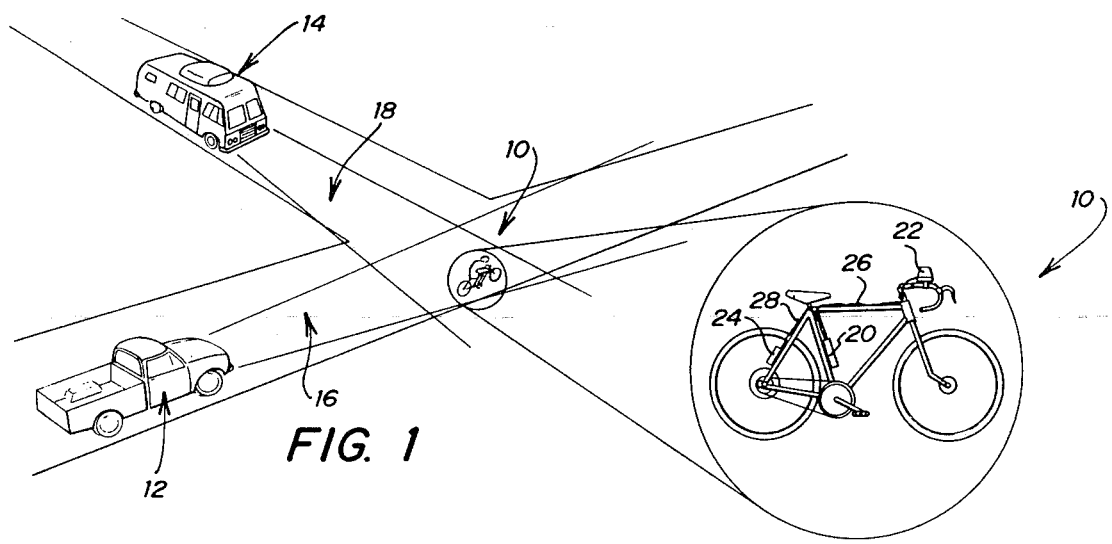
FIG. 1
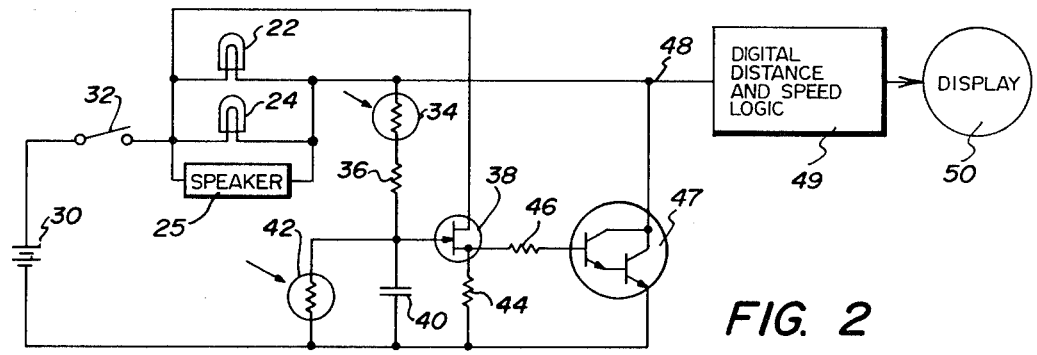
FIG. 2
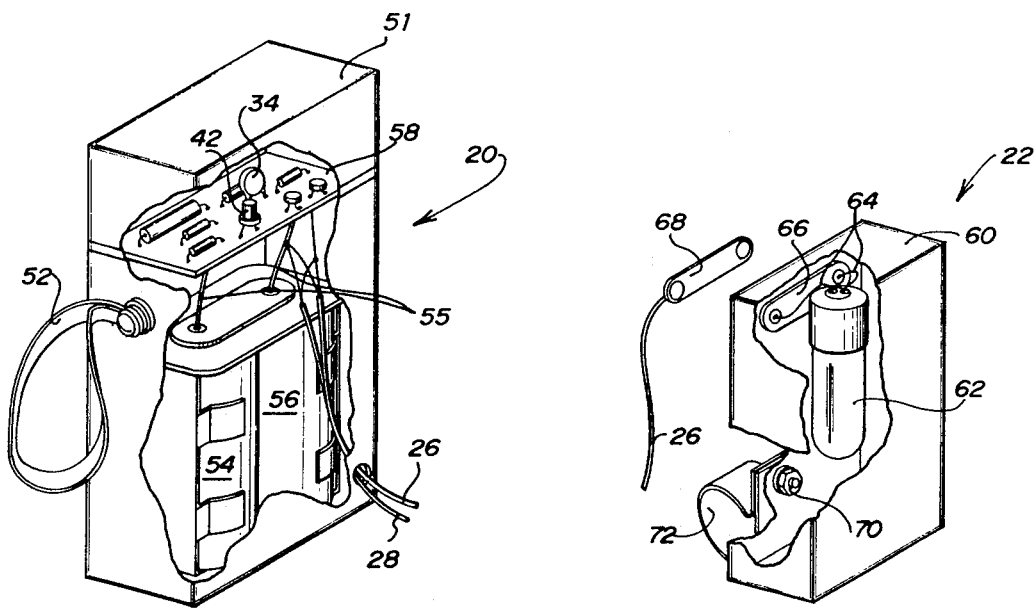
FIG. 3
FIG. 4

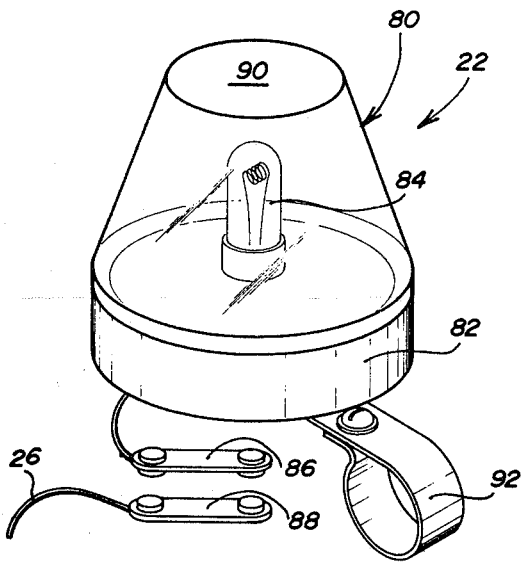
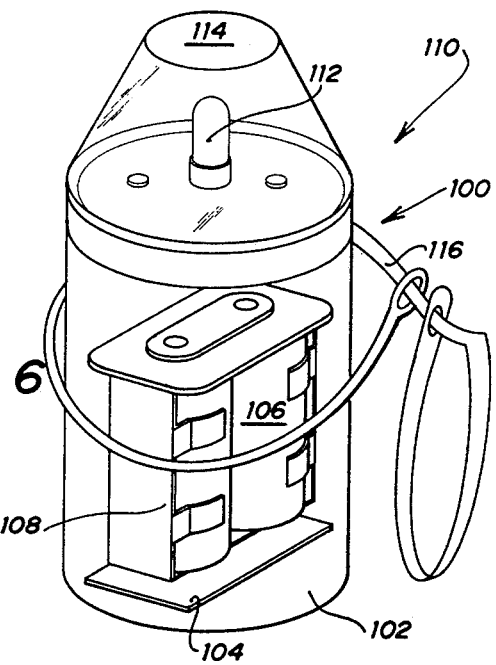
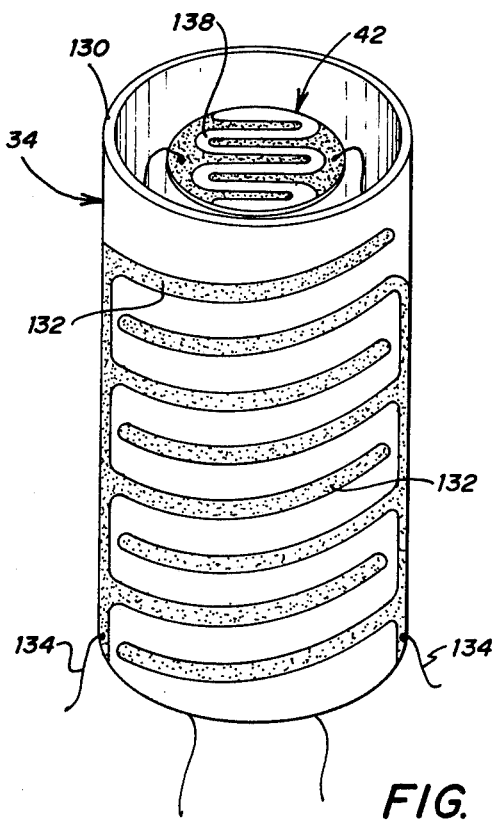
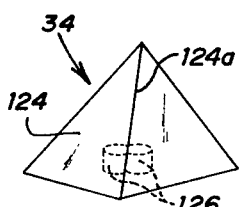
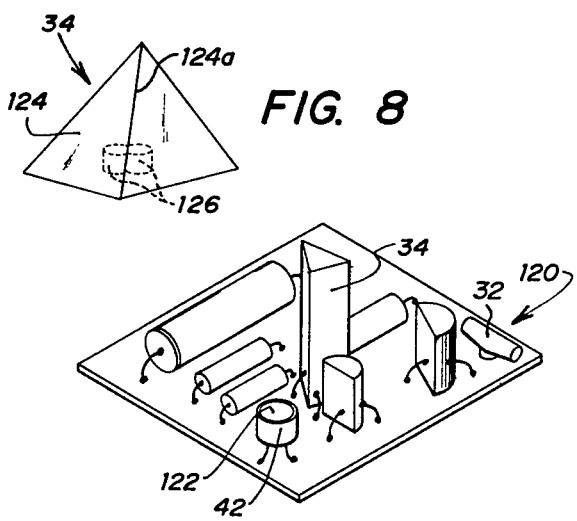
FIG. 5
FIG. 6
FIG. 8
FIG. 9
FIG. 7

LIGHT DETECTION, SIGNALING AND SPEED MEASUREMENT SYSTEM

RELATED APPLICATIONS

This is a continuation in part of application Ser. No. 669,677 filed Mar. 23, 1976, entitled Light Detection and Signaling System and now U.S. Pat. No. 4,117,457, issued Sept. 26, 1978.

FIELD OF THE INVENTION

This invention relates to detection and signaling systems, and more particularly relates to a system for detecting and measuring the speed of an incident light source.

THE PRIOR ART

Problems have long existed in maintaining adequate visibility at night or dusk between a vehicle and objects such as another vehicle or a stationary obstacle. In particular, problems have heretofore arisen in maintaining visibility between an automobile and a physically small unit such as a bicycle or motorbike having a size and maneuverability such as to present a potential safety hazard if it is not seen by the other automobile operator. Attempted solutions to this visibility problem have included reflectors, lights and flags carried by the bicycle or motorbike, along with light colored reflecting clothing for the rider.

However, none of these solutions heretofore proposed has been completely satisfactory. For example, reflectors, while having the advantage of being passive devices and requiring only incident ambient energy, generally reflect incident light back in a narrow angle and are thus effective only in a limited angle and direction. Battery operated lights have heretofore required the operator to turn them on, and are thus subject to human error. Moreover, battery operated lights often do not provide a light output of sufficient intensity for good visibility and in many cases do not provide light radiation over 360° in the horizontal plane. Flags and other wind driven reflective objects have an advantage of being passive and of varying the reflected light via motion, but have the substantial limitations of low reflection efficiency and undesirable directionality. Moreover, previous indicator devices have generally not provided the rider of the bicycle or motorbike with an indication of an approaching vehicle, and have not had the ability to indicate the distance or speed of an approaching vehicle.

Systems have been heretofore proposed wherein lights are illuminated upon the detection of approaching vehicle headlights. For example, U.S. Pat. No. 1,774,457, issued Aug. 26, 1930, teaches a technique for illuminating a roadside sign only at night in response to vehicle headlights. U.S. Pat. No. 3,893,000, issued July 1, 1975, teaches illuminating highway lighting upon the passage of a vehicle. Similarly, barricade flashers have been heretofore proposed which have circuitry for controlling the power applied to the lamp in order to lengthen the battery life. However, none of the aforedescribed systems have been adaptable for use with a two wheeled vehicle, and have not been suitable for use as a safety device which is automatically operable only at dusk or at night in addition to providing an indication both to the rider of the two wheeled vehicle and to the driver of the approaching motor vehicle of the existence of the two wheeled vehicle.

Moreover, such previously developed systems have not provided an indication of the distance or rate of speed of the approaching motor vehicle to the rider of the two wheeled vehicle. Additionally, such systems have not been capable of detecting the presence of a light source for security system type application.

A need has thus arisen for a light detection, signaling and velocity measuring system in which incident light from a source is detected and in which the system provides a visual indication of the detected light source. Furthermore, a need has arisen for a system to provide an indication of the velocity or rate of speed of an approaching incident light source.

SUMMARY OF THE INVENTION

In accordance with the present invention, circuitry is provided for measuring the velocity of an incident light source for use in a system for detecting and signaling the presence of an incident light source.

In accordance with the present invention, a system for detecting and signaling the relative velocity of a localized light source located at a distance from the system includes circuitry for detecting the relative velocity of the light source moving with respect to the system and for generating a signal having a time variation representative of the detected relative velocity. Circuitry is further provided for generating an output signal representative of the relative velocity of the light source responsive to the time varying signal for detecting the relative velocity of the light source. A visual display is provided for displaying the relative velocity of the source moving with respect to the system.

In accordance with another aspect of the present invention, a light detection and signaling system includes a first photosensitive surface having a configuration responsive to localized light sources emanating from any point in a horizontal plane surrounding the first photosensitive surface. A second photosensitive surface is disposed to receive largely ambient light and to be nonresponsive to localized light sources in the horizontal plane. The system includes at least one light emitting device. Circuitry is provided to control the output of the light emitting device in response to light incident on the first and second photosensitive surfaces, such that the light emitting device is selectively illuminated when the first photosensitive surface detects a localized light source and the second photosensitive surface detects the absence of a predetermined level of ambient light. The system further includes circuitry for causing the light emitting device to flash on and off and circuitry for detecting the rate of flashing of the light emitting device. Additionally, the system includes circuitry for computing an approximation of the speed of the localized light source in response to the detected rate of flashing of the light emitting device.

DESCRIPTION OF THE DRAWINGS

For a more complete understanding of the present invention and for further objects and advantages thereof, reference is now made to the following description taken in conjunction with the accompanying drawings, in which:

FIG. 1 is a somewhat diagrammatic view of the present invention employed upon a bicycle;

FIG. 2 is an electrical schematic of a detection and signaling system used in connection with the speed measurement circuitry of the present invention;

FIG. 3 is a partially broken away view of a housing employing the electrical circuitry shown in FIG. 2;

FIGS. 4 and 5 illustrate light signaling sources for use with the present invention;

FIG. 6 illustrates the use of the present invention employed for being carried by a pedestrian;

FIGS. 7, 8 and 9 illustrate components of the light detection system utilized with the present speed measurement circuitry;

DESCRIPTION OF THE PREFERRED EMBODIMENT

Figure 10:
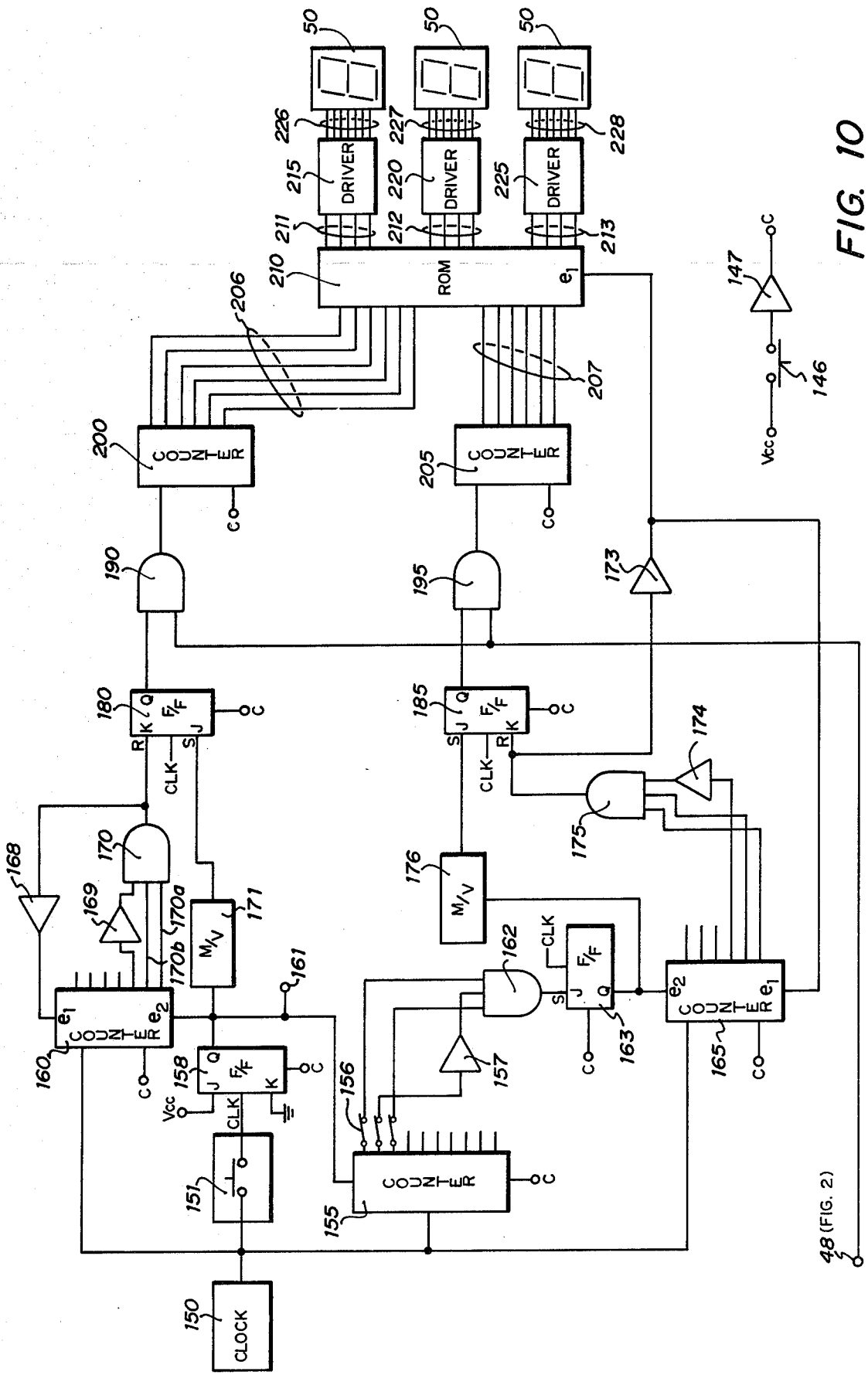
FIG. 10 is a detailed electrical schematic of the speed measurement circuitry illustrated in block diagram form in FIG. 2.

Referring to FIG. 1, a somewhat diagrammatic illustration of a typical utilization for the present speed measurement circuitry in a light detection and signaling system is illustrated. The present invention can be utilized in a system mounted on a bicycle generally identified by the numeral 10 which is being pedaled along the side of a highway. A first motor vehicle 12 is shown approaching the bicycle 10 from one direction, while a second motor vehicle 14 is shown approaching the bicycle 10 from the second direction. The light condition is assumed to be dusk or after sunset, such that motor vehicles 12 and 14 are directing headlight beams 16 and 18 toward the bicycle 10. With the use of the present invention, flashing lights are generated from the bicycle 10 which warn the drivers of the motor vehicles 12 and 14 of the bicycle 10, and which also warn the rider of bicycle 10 of the approaching vehicles.

FIG. 1 illustrates an enlarged view of the bicycle 10, illustrating a headlight detecting and control unit 20, along with a front light 22 and a rear light 24. Wires 26 connect the control unit 20 with light 22, while wires 28 connect the control unit 20 with the light 24.

In operation of the light detection portion of the present system, photosensitive surfaces in the control unit 20 detect the presence of either or both of the headlight beams 16 or 18. The lights 22 and 24 are thus energized to flash. The rate of flashing of the lights 22 and 24 varies in dependence on the distance from the motor vehicles 12 and 14 to the bicycle 10. An increase in the rate of flash indicates to the rider of the bicycle that the vehicle is coming closer. As will subsequently be described in detail, the present invention includes circuitry to provide an indication of the relative speed and motion of the bicycle with respect to the vehicle or incident light source.

FIG. 2 illustrates a schematic diagram of the detection and signaling portion of the present invention. A battery 30 is connected through an off-on switch 32 to energize the lights 22 and 24 (FIG. 1) and a speaker 25. Lights 22 and 24 and speaker 25 are connected in parallel and are connected at one terminal to a photosensitive resistor 34 which is connected in series with a fixed resistor 36 to the gate of a unijunction transistor 38. The other terminals of the lights 22 and 24 and speaker 25 are directly connected to one of the drains of the unijunction transistor 38. A capacitor 40 is tied across the gate of the transistor 38 and circuit ground. A second photosensitive resistor 42 is connected across capacitor 40. The function of speaker 25 will be subsequently described.

An output from unijunction transistor 38 is provided across a resistor 44, which is tied through a resistor 46 to a Darlington amplifier 47 which includes two transistors connected in a Darlington configuration. A terminal of the Darlington amplifier 47 is connected directly to the parallel connected lights 22 and 24. The photosensitive resistor 42 is oriented so as to be primarily sensitive to ambient light. The photosensitive resistor 34 is oriented so as to be primarily responsive to direct incident light directed primarily along the horizontal plane.

In operation of the circuitry shown in FIG. 2, if switch 32 is closed and the photosensitive resistor 42 senses a low level of ambient light, when the photosensitive resistor 34 detects incident light the circuit generates short duration high current pulses through the resistor 44. The pulses are applied through the Darlington amplifier 47 to energize the lights 22 and 24 to provide short pulses of light. The pulse repetition frequency of these pulses is primarily controlled by the resistance of the photosensitive resistor 34, inasmuch as resistance of resistor 42 is high due to the low ambient light level. As the resistance of the photosensitive resistor 34 is a function of the magnitude of light impinging thereon, the pulse repetition frequency increases as the magnitude of incident light increases. As will subsequently be described, any nonzero value of pulse repetition frequency is a direct measure of the relative distance to the light source, since the light incident on the surface of photosensitive resistor 34 from a source at a distance is known to be approximately inversely proportional to the square of the distance. Further, the time rate of change of the pulse repetition frequency, or its first derivative, is also a measure of the velocity of the light source relative to the present system.

Use of the present system enables drivers of approaching motor vehicles to see a flashing light to clearly identify the location of the bicycle 10. Further, the rider of the bicycle 10 is provided with a flashing light 22 which indicates to him that a motor vehicle is approaching. By watching the rate of flashing of the light, the rider of the bicycle may be provided with an indication of the closeness of the motor vehicle. The speed of the motor vehicle is also indicated on the display of the present invention. The lights 22 and 24 are particularly located so as to be on a direct line of sight to each nearby driver of a motor vehicle.

The photosensitive resistor 42 is connected to the circuit shown in FIG. 2, such that when the general ambient light level is at least as great as the light incident upon the photosensitive resistor 34, the flash rate of the oscillator circuitry is reduced to zero. In this state, the system is converted to a very low power consumption state, with power loss occurring primarily because of the resistances of resistor 44 and the interbase resistance of unijunction transistor 38. The system is not thus required to be on when ambient light is available to provide adequate visibility, such as in daylight or on well lighted streets or parking lots. However, when the system is placed in low light level environments, the invention automatically becomes energized in order to provide a flashing indication of the existence of the system.

Further referring to FIG. 2, connected to the output of the Darlington amplifier 47 along signal line 48 is the digital distance and speed logic circuit of the present invention, identified by block 49 which operates a display 50. Circuitry 49 of the present invention quantitatively measures the velocity and motion of the approaching motor vehicle or incident light source.

Although the power density from a light source is inversely proportional to the square of the distance x from the source, at a great distance of, for example 250 feet, a good linear approximation can be made of the form:

$$x^{-1} = a_1 P + b, \quad (1)$$

where,
x = distance of measurement site from the source,
b, $a_1$ = constants ($a_1$ being negative), and
p = power density measured at distance x from the source.

In addition, consider a photosensitive surface at a distance x with a light dependant resistance R. Thus, $$P = a_2 R^{-1}, \quad (2)$$

where,
R = resistance of photosensitive surface,
$a_2$ = a constant which takes into account incidence angle and area of sensitive surface, and
P = incident light power density.

Next, consider the resistance R above to represent the light dependent resistance of surface 34 in FIG. 2. Capacitance 40 and resistors 34 and 36 form a series RC circuit whose charging rate controls the period T of the oscillator previously described. This is expressed by:

$$RC = a_3 T, \quad (3)$$

where,
R = the light dependent resistance of surface 34 plus resistance 36 in ohms,
C = capacitance of capacitor 40 in farads, and
$a_3$ = unitless constant.

Combining the above-noted relationships and differentiating, the following results:

$$v = x' = (a_3/a_1 a_2 C) T' \quad (4)$$

where, v = speed.

A simple method of measuring the period T thus provides a measure of the speed of the light source at a distance x. A light source moving with respect to a light dependent variable oscillator such as shown in FIG. 2 at a distance x will cause the pulse rate of the oscillator to vary. As the vehicle approaches, the distance x decreases and the pulses occur more frequently with correspondingly shorter periods T. Allowing $m_1$ and $m_2$ to comprise the number of pulses in different time periods $T_1$ and $T_2$, respectively, then the change in the period may be defined as:

$$\Delta T = \overline{T}_2 - \overline{T}_1, \quad (5)$$

where, $\overline{T}_2, \overline{T}_1$ = average period in intervals 2 and 1 respectively.

Now $$\overline{T}_1 = t_s/m_1, \quad \overline{T}_2 = t_s/m_2, \quad (6)$$

where $t_s$ = the duration of the sampling period.

$$T' = \Delta T/t_i = t_s/t_i (1/m_2 - 1/m_1), \quad (7)$$

where $t_i$ = time lapse between samples.

Hence, $$v = x' = (a_3 t_s / a_1 a_2 C t_i)(1/m_2 - 1/m_1) \quad (8)$$

Letting $M = a_3 t_s / a_1 a_2 C t_i$, then:

$$v = M(1/m_2 - 1/m_1). \quad (9)$$

Hence, the speed may be obtained by counting the number of pulses $m_2$ and $m_1$, taking the reciprocals thereof, subtracting and multiplying by a positive constant M. Since M is a scale factor, it is clear that the values of certain components of M may be selected to provide a convenient value of M for computational purposes, and that M may be provided with any desired unit of distance such as feet or miles.

As will subsequently be described in connection with FIGS. 10, 11 and 14 logic circuit 49 outputs the value of v, being $v = M(1/m_2 - 1/m_1)$, Equation 9, as noted above. Generally, logic circuit 49 includes counting circuits to detect the rate of flashing of the detection portion of the present system at different time intervals and functions to calculate the derivative of the pulse period of the pulses generated by the circuitry of FIG. 2 and output values corresponding to the derivative of the pulse period. The resulting output of circuit 49 is applied to display 50 in order to provide a digital display of the speed of an approaching vehicle or incident light source. A display may also be provided for displaying the relative distance of the vehicle from the system.

It will be understood that the present distance and speed logic circuit 49 shown in FIG. 2 may also be utilized in a stationary configuration to provide a visual indication of the speed of an approaching vehicle and for the detection of motion of an object in any other desired environment.

FIG. 3 illustrates a control unit 20 utilized with the present invention. Control unit 20 may be seen to include a housing 51 which may be comprised of light-weight plastic or the like. Housing 51 may be attached to bicycle 10 by means of a strap 52 which may comprise, for example, the TS5H strap manufactured and sold by Burndy Corporation. Strap 52 is connected to the housing 51 by a suitable machine screw, lock washer and nut. A battery clip 54 is located in the lower portion of the housing 51 and holds four penlight double-A size batteries 56 in the conventional manner. A printed circuit board 58 is disposed in the upper portion of the housing 51 and includes the components shown in the schematic of FIG. 2.

The top portion of the housing 51 is formed from transparent plastic so as to allow the passage of light therethrough. The photosensitive resistor 34 is shown as being disposed to receive incident light from any point along a horizontal plane. The photosensitive resistor 42 is shown as being oriented to be primarily responsive to ambient light. Power to the circuitry of FIG. 2 is provided by wires 55 connected to the batteries 56. Wires 26 and 28 are shown leading from the housing 51 to the lights 22 and 24 previously described. The printed circuit board 58 is suspended within the top of the housing 51 by the use of clear or transparent rigid plastic resin.

FIG. 4 illustrates a configuration for lights 22 or 24 previously shown in FIG. 1. The lights 22 and 24 include a clear or colored transparent plastic housing 60 within which is mounted a lamp 62. Wires 64 extend from the lamp 62 through a metal clip contact member 66 which is adapted to mate with a connector clip 68. Wires 26 extend from the clip 68 to the control unit 20. A metal machine screw 70 is cast within the plastic housing 60 and includes a threaded portion which passes through holes in a metal strap 72 which may be attached to a suitable tubular frame member on the bicycle 10 in a conventional manner. The lamp 62 is preferably of a high intensity type. If desired, a lamp unit rated lower than the applied voltage can be utilized to achieve a brighter flash.

FIG. 5 illustrates another configuration of light 22 which comprises a truncated conical clear plastic cover 80 and a lower cylindrical body 82. A filament lamp 84 is mounted within the light 22 and is connected through suitable wires to a contact clip 86 which is adapted to mate with a clip 88. The top 90 of the cover 80 and the side walls may be coated with a reflective or colored translucent material to restrict light emission to a selected portion of the horizontal plane perpendicular to the axis of the lamp 84 and to increase the intensity, directionality and aesthetic appearance thereof. The light 22 may be connected to a tubular member of a bicycle or clip member 92 or by any other suitable mounting technique.

FIG. 6 illustrates the present system suitable for carrying by pedestrians or by the operator of a vehicle whose vehicle is disabled. Alternatively, this structure may be placed in a stationary position and utilized as a motion detector. The structure includes a cylindrical housing 100 having a lower portion 102 which is light transparent. A circuit board 104 may comprise circuit boards similar to that shown in FIG. 3 and includes the two photosensitive surfaces previously noted, along with the other components of the electrical schematic shown in FIG. 2. The components on the electrical circuit board 104 are connected to batteries 106 contained within a battery clip 108. The lower portion 102 may be filled with a transparent material such as a plastic resin to serve as a section of a cylindrical or spherical lens and thereby increase the sensitivity of the photosensitive detector.

Further referring to FIG. 6, a light unit 110 may be constructed similarly to the light unit shown in FIG. 5, and includes a lamp 112 which is energized in response to the electrical circuitry contained on the printed circuit board 104 in the manner previously described. The top 114 of the transparent housing 100 may be light reflective to increase the intensity of the reflected light. The top 114 may be snap fit onto the top of the housing 100 or may be attached by screws, if desired. The structure shown in FIG. 6 may be attached by a carrying strap 116 to the wrist or to the belt of the user. Strap 116 may comprise a flexible plastic or leather strap constructed in the manner illustrated.

FIG. 7 is a representation of a printed circuit board 120 bearing the components of the light detection and signaling portion of the electrical circuit shown in FIG. 2. The photosensitive resistor 34 may be seen to comprise an upright three-sided member having a triangular cross-section. This configuration thus receives light from any point located on a horizontal plane and picks up the headlights from any motor vehicle approaching from any direction to the bicycle 10 (FIG. 1). Conversely, the photosensitive resistor 42 is mounted such that the photosensitive surface 122 thereof is responsive only to light having a primarily vertical component. With the illustrated configuration, the photosensitive resistor 34 is thus responsive to lights from oncoming vehicles, while the photosensitive resistor 42 is primarily responsive only to ambient light in order to turn the system from a low power consumption to a normal operating condition in a dark ambient environment.

FIG. 7 also illustrates the interconnection of switch 32 (FIG. 2) and may comprise, for example, a position sensitive switch such as a mercury-in-glass switch typically utilized in thermostat control applications. Switch 32 is mounted to printed circuit board 120 to close and complete the circuit shown in FIG. 2 when the flat surface of printed circuit board 120 is horizontal. Switch 32 opens the circuit of FIG. 2 when printed circuit board 120 is turned approximately 90° to a vertical position. The rotation of printed circuit board 120 is accomplished by pivoting control unit 20 (FIGS. 1 and 3) about the machine screw which attaches housing 51 to a fixed reference such as bicycle 10 using strap 52, or by positioning the self-contained system of the present invention as shown in FIG. 6 in a horizontal position rather than the vertical position shown in FIG. 6.

It will be understood that the photosensitive resistor 34 may comprise a cylindrical element, or alternatively may comprise a four-sided element or the like. The photosensitive resistor 34 is mounted above the remaining components on the board 120 so that the photosensitive surfaces thereof are not blocked from receiving light by the other components.

FIG. 8 also illustrates the photosensitive resistor 34. A clear plastic pyramid body 124 is provided having a photosensitive resistor 126 embedded in the center thereof. Light entering the transparent pyramid body 124 is thus received by the photosensitive resistor 126 to provide the prior described operation. Light entering nearly normal to the edges of the side of the pyramid body 124 is bent so as to be nearly normal to a light sensitive surface of the photosensitive resistor 126. Thus, light transmitted through the corners 124a of the pyramid body 124 increases the amount of light received by the photosensitive resistor 126 to provide a more sensitive light receiving device. An observer viewing the embedded photosensitive resistor 126 at corner 124a will see an apparent double image, indicating an effectively larger sensitive surface in the direction of corner 124a.

FIG. 9 illustrates a further structure for the photosensitive resistor 34 comprising a cylindrical member 130 having a photosensitive pattern 132 formed thereon and connected with output wires 134. A similar pattern is provided on the opposite side of the cylindrical body 130. The cylindrical body 130 thus detects light emanating from any point along the horizontal plane to provide an omnidirectional detector. Conversely, the photosensitive resistor 42 comprises a cylindrical member having a photosensitive surface 138 thereon. The photosensitive surface 138 is mounted inside the top portion of the cylindrical member 130 and is oriented generally horizontally, so as to be primarily responsive to ambient vertical light. Light emanating in the horizontal plane would not be generally detected by the photoconductive surface 138.

FIG. 10 illustrates the circuitry of the present invention comprising the digital distance and speed logic block 49 of FIG. 2. This circuitry functions to calculate the velocity, $v = M(1/m_2 - 1/m_1)$, Equation 9. The circuitry of the present invention avoids the use of firmware or software methods of obtaining reciprocals by storing the velocity corresponding to the values of $m_2$ and $m_1$ in a read only memory (ROM), a programmable read only memory (PROM) or an erasable programmable read only memory (EPROM).

Referring to FIG. 10, a clock 150 is connected through a momentary contact switch 151 to the clock input of a J-K flip-flop 158. The output of clock 150 is also applied to the enable input of a binary counter 155. The resulting Q output of flip-flop 158 enables a binary counter 160. The output of flip-flop 158 also triggers a single shot multivibrator 171 which sets a J-K flipflop 180. The resulting Q output of flip-flop 180 enables AND gate 190 to cause input pulses from the circuitry shown in FIG. 2 to be applied along signal line 48 to a binary counter 200. Flip-flop 180 also receives an input from counter 160 through an inverter 169 and an AND gate 170. The output of AND gate 170 is also applied through an inverter 168 to counter 160.

Binary counter 160 counts pulses provided by clock 150 to establish the sampling period $t_s$ defined in Equation 6 as the period during which $m_2$ is to be counted. The length of sample period $t_s$ is established by the frequency of clock 150 and the particular high order logic bits of counter 160 used to drive AND gate 170. Three inputs to AND gate 170 are shown for illustration only, it being understood that any logic bit pattern output from counter 160 may be selected by connecting any n logic bits of counter 160 to an n input AND gate 170 and using inverters in lines where low binary digits are desired. FIG. 10 illustrates one configuration of a logic bit pattern in which a 1,1,0 high order logic bit pattern is required to enable AND gate 170 through signal lines 170a and 170b and inverter 169. The function of the logic connecting clock 150 to counter 200 is to count $m_2$ pulses into counter 200 in a selected sampling period $t_s$ created by counter 160.

Counter 155 creates a selected delay between the sampling period of counter 160 and an equal sampling period established by a binary counter 165. Binary counter 165 receives an input from clock 150, and may comprise a counter similar in configuration to counter 160. The delay between sampling periods is created by selection of output signal lines of counter 155 using switches 156 to drive an AND gate 162 through an inverter 157. AND gate 162 may comprise, for example, a three input AND gate, it being understood that any n logic bit pattern from counter 155 may be utilized by connecting any n logic bits of counter 155 to an n input AND gate 162 and using inverters 157 in single lines where low binary digits are desired. FIG. 10 illustrates a logic bit pattern of 1,0,1 high order logic bit pattern to enable AND gate 162, which sets a J-K flip-flop 163 to enable binary counter 165. The output of counter 165 is applied through an inverter 174 and an AND gate 175 to a J-K flip-flop 185. The output of flip-flop 163 is applied through a single shot multivibrator 176 to the J input of flip-flop 185. The resulting Q output of flip-flop 185 is applied to an AND gate 195. Enabling of AND gate 195 causes input pulses $m_1$ to be applied via signal line 48 (FIG. 2) to a binary counter 205. When a 1,1,0 logic bit pattern is sensed by inverter 174 and AND gate 175, flip-flop 185 is reset to disable AND gate 195 and the counting and application of pulses from signal line 48 to counter 205 terminates. Counter 205 then contains the value of $m_1$ of the velocity formula (Equation 9).

Counter 200 inputs the value of $m_2$ and counter 205 inputs the value of $m_1$ via signal lines 206 and 207 to a read only memory 210. Read only memory 210 is shown as having 12 input lines and 4096 address locations. Alternatively, read only memory 210 may comprise, for example, three 4096×4 bit ROMs such as those manufactured and sold by American Microsystems under the model designation S8996. The three output, 4 bit words from ROM 210 are applied via signal lines 211, 212 and 213 to the address lines of BCD to 7-segment decoder drivers 215, 220 and 225. Driver 215 is interconnected to display 50 (FIG. 2) via signal lines 226, driver 220 is interconnected to display 50 via signal lines 227 and driver 225 is interconnected to display 50 via signal lines 228. Display 50 (FIG. 2) thereby displays the contents of read only memory 210 at the address selected by $m_2$ and $m_1$ inputs to read only memory 210. The values stored in read only memory 210 are the desired velocities in binary coded decimal (BCD) format.

The speed measurement calculation is initiated by manually activating switch 151. Reset switch 146 is utilized to clear all dynamic devices in the circuit via connection of $V_{cc}$ to point C of counters 155, 160, 165, 200 and 205 and flip-flops 158, 163, 180 and 185 through an inverter 147. Inverters 168 and 173 provide a low input to counters 160 and 165 to inhibit counting. Inverter 173 further enables read only memory 210 only when values for both $m_2$ and $m_1$ are present, therefore blanking display 50 during accumulation of counts.

Figure 11:
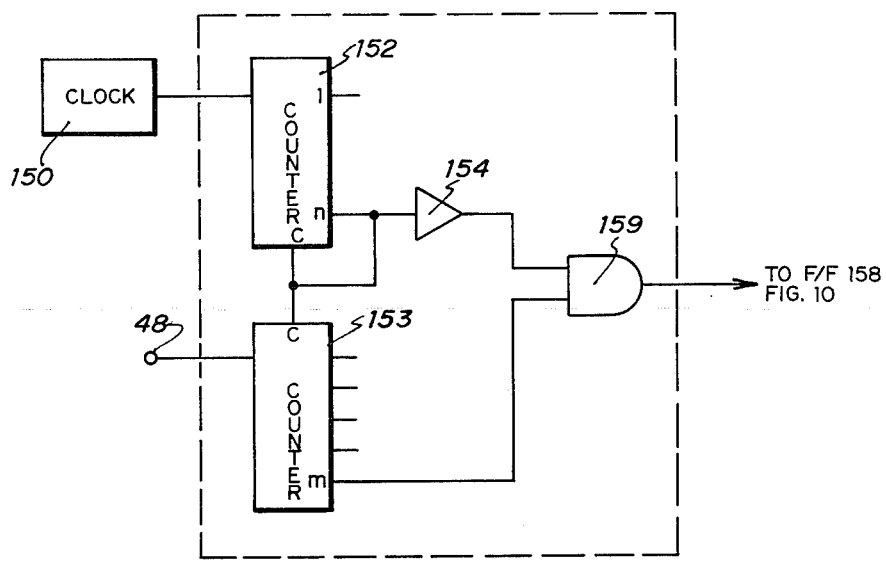
FIG. 11 is an alternative embodiment of the enable portion of the speed measurement circuitry illustrated in FIG. 10.

Referring to FIG. 11, an alternative embodiment of the enable portion of the speed measuring system of the present invention is illustrated. The logic circuitry illustrated in FIG. 11 performs the function performed by switch 151 (FIG. 10). The circuitry shown in FIG. 11 senses the input pulse rate from signal line 48 and activates the speed measurement circuit of FIG. 10 when the pulse rate exceeds a predetermined level. Clock 150 drives a counter 152. The input pulses from the circuit shown in FIG. 2 via signal line 48 drive a counter 153. When the pulse rate via signal line 48 reaches a predetermined level of m/n, the speed measurement circuitry (FIG. 10) is activated. Assume that counter 152 reaches a count n. Count n clears both counters 152 and 153 to a zero count. Counter 153 begins counting input pulses supplied via signal line 48. If counter 153 reaches count m before counter 152 reaches count n then the counters 152 and 153 enable an AND gate 159 via a high logic state from counter 153 and a high logic state from an inverter 154 interconnecting counter 152 to AND gate 159. AND gate 159 then activates flip-flop 158 (FIG. 10) in the manner previously described with respect to switch 151 of FIG. 10. Therefore, an output from AND gate 159 indicates that a light source has moved into range of photosensitive detector 34 (FIG. 2) so that the adjustable value m/n is exceeded. The automatic actuation of the speed measurement circuit (FIG. 10) permits the use of the speed measurement circuit in unmanned modes of operation to record speeds of moving light sources. In this application, display 50 and reset switch 146 may be located at a remote site from the actual measurement site.

When the value of $m_1$ equals the value of $m_2$, the light source speed is zero (see Equation 9). Therefore, the present system can also be utilized as a motion detection system in addition to a velocity measurement system. As a motion detection system the automatic activation circuit of FIG. 11 serves to limit detection to sources whose motion exceeds a predetermined value characterized by the ratio of m to n, established by counters 152 and 153. In security applications the lights 22 and 24 (FIG. 2), display 50 and reset switch 146 could be remotely located from the motion and speed detection portion of the system. Unauthorized persons entering an area or road monitored by the speed and motion detection circuit of the present invention would alert security personnel via the remote display 50 and lights 22 or 24. In security and other applications, lights 22 and 24 may be supplemented or replaced with speaker 25 (FIG. 2) to produce an audible signal at the flash rate or pulse rate of the output of the detection portion of the present system. An audible signal provides the present system with the additional capability for use by blind persons or where vision is obstructed. Logic circuitry can be provided to activate speaker 25 only when the value of m/n is exceeded.

Figure 12:
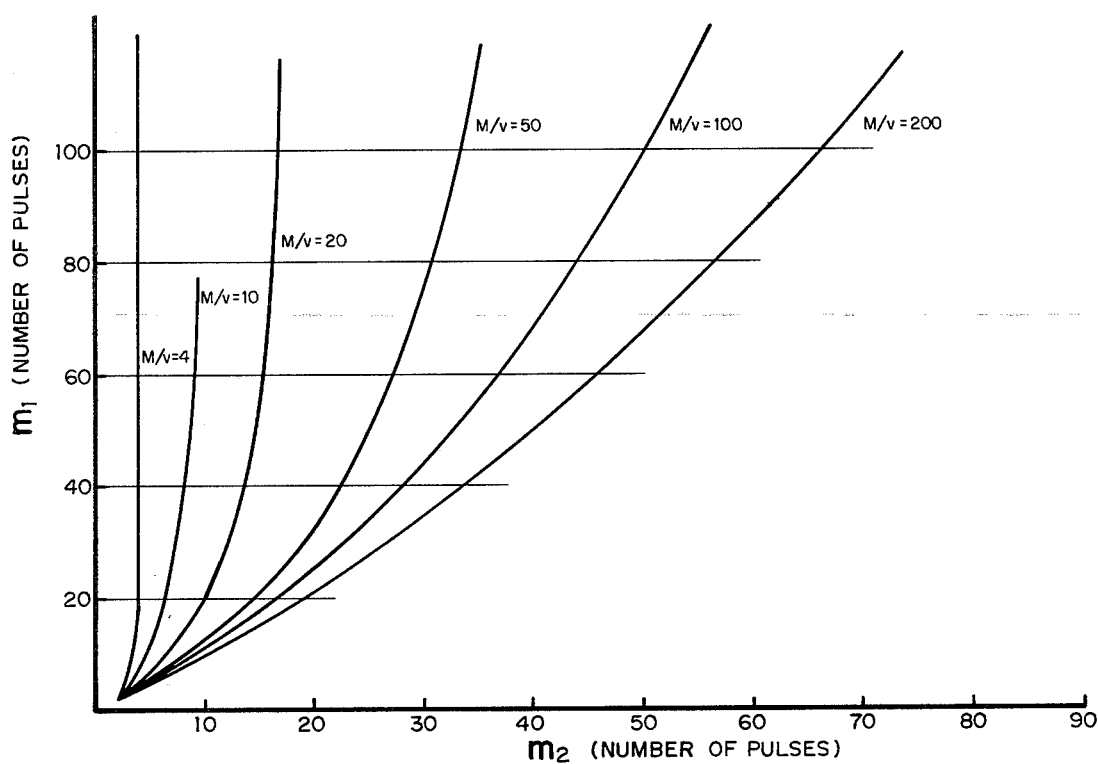
FIGS. 12 and 13 are graphical representations showing the relationship between parameters utilized by the present speed measurement circuitry to perform speed measurement calculations.
Figure 13:
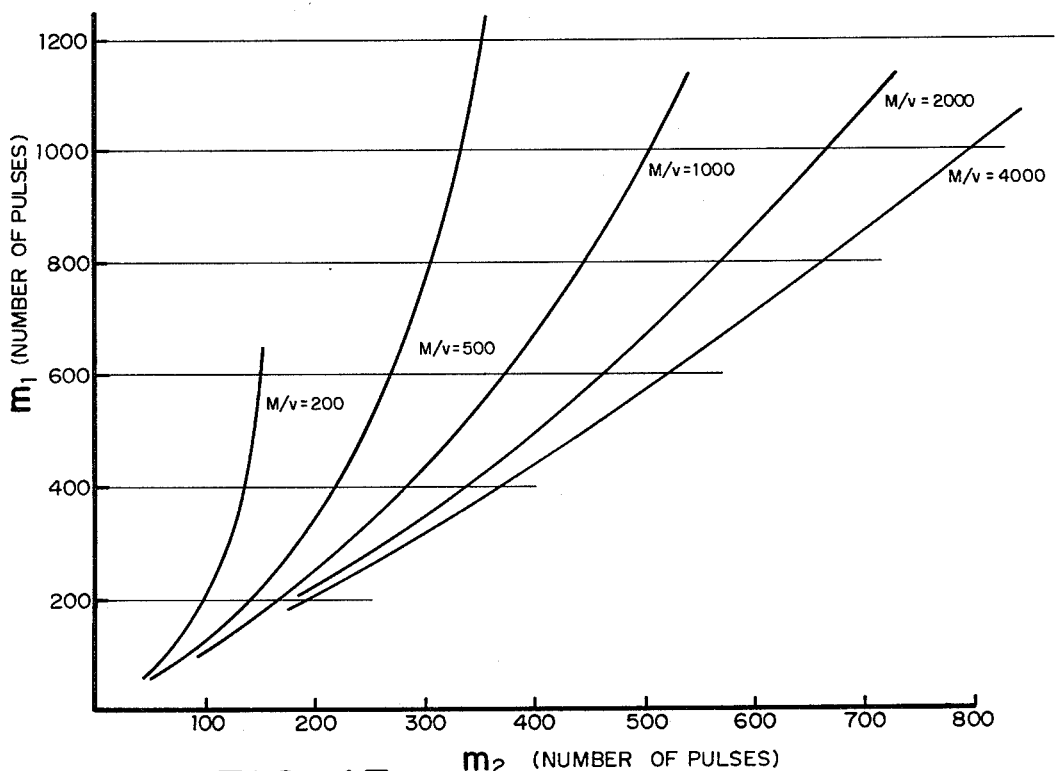

The function for v expressed in Equation 9 can be used to determine the relationship of circuit parameter values to a desired accuracy of computation. Since M is a proportionality constant whose value can be changed by selection of a number of circuit and component parameters, it can be treated as a composite system parameter. The relationship between $m_1$, $m_2$ and M/v is shown in FIGS. 12 and 13. Each curve represents a selected value of M/v. Recalling from Equations 8 and 9, $M = a_3 t_s / a_1 a_2 C t_i$, the value of M may be selected by choice of circuit parameters $a_1$, $a_2$, $a_3$, C, $t_s$ and $t_i$ previously defined. The sampling interval $t_s$ can be varied by choice of counters 160 and 165 and by choice of output lines as discussed earlier or by the selection of the frequency of clock 150. The delay $t_i$ between sampling periods is adjusted by selection of the frequency of clock 150 and choice of counter 155 and selection of output lines on counter 155. The power resistance characteristic, $a_2$, is changed by choice of photosensitive element 34 together with or independent from control of the geometric relationships such as angle of incidence and light source on element 34. Capacitor 40, resistors 34 and 36 may be varied to thereby change the parameter $a_3$.

FIGS. 12 and 13 illustrate the relationship between M, v, $m_2$ and $m_1$. As an example, if the parameter M=200,000, then the M/v=500 curve represents $m_2$ and $m_1$ for a 400 mile per hour source. It can be determined from both FIGS. 12 and 13 that larger M/v values result in larger absolute values of $m_2$ and $m_1$ and that velocity measurements will be more accurate for larger M/v since a 1-count error will be a smaller percentage of larger $m_2$, $m_1$ values.

Figure 14:
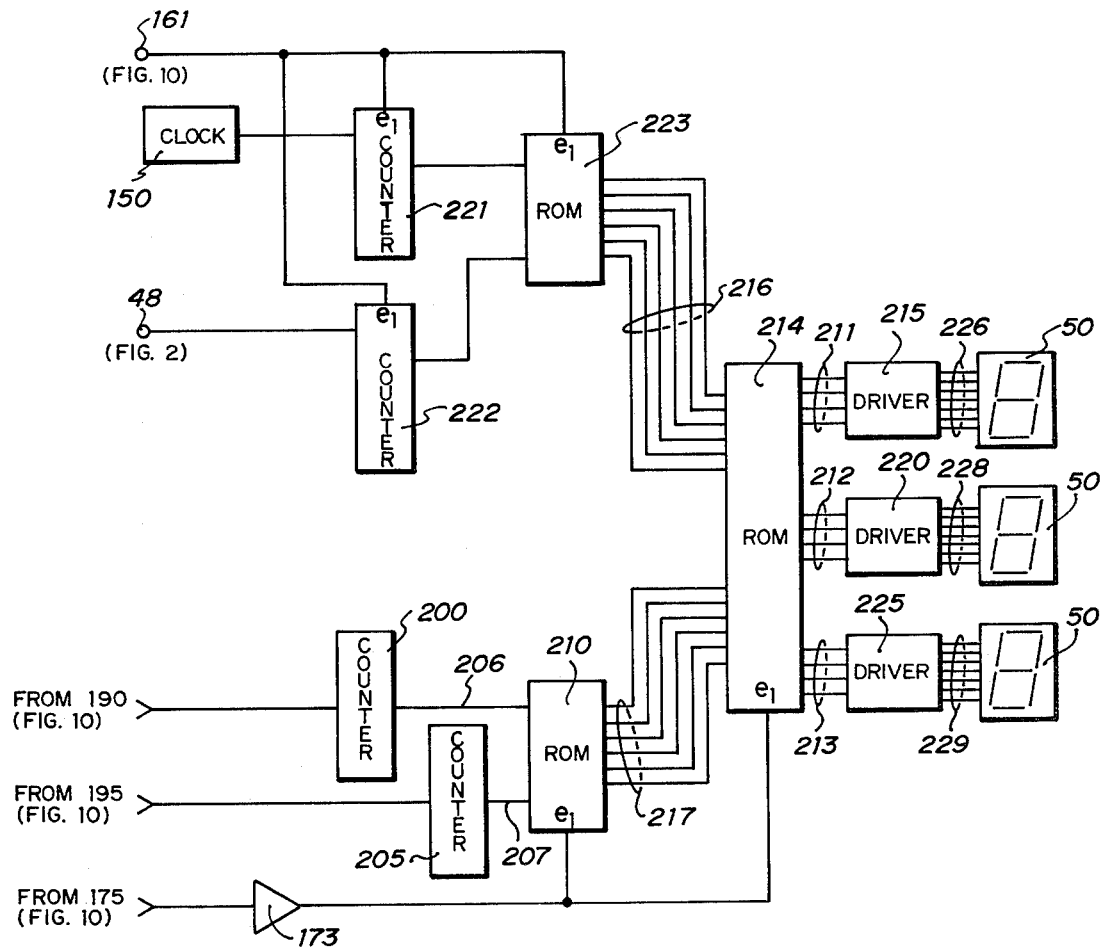
FIG. 14 is an alternative embodiment of the speed measurement circuitry illustrated in FIG. 10.

FIG. 14 illustrates an alternative embodiment of the present logic circuitry for determining velocity measurement. Recall that Equation 1 expresses an approximation for the relationship between inverse distance and power density. The exact expressin is:

$$P = a_4/x^2 \tag{10}$$

Where, $a_4$ = a proportionality constant and x and P are previously defined. Substitution of Equation 10 for the expression of P in Equation 1 for the prior equations results in an exact expression for v being:

$$v = \tfrac{1}{2}(a_4 a_3/a_2 C)^{1/2} T'/T^{1/2} \tag{11}$$

where, T' equals a time rate of change of the period T of a light dependable variable oscillator.

Noting the elements of Equations 7 and 9, one observes that T' and v differ by a constant. Therefore, it is possible to store the value for kT' in read only memory 210 (FIG. 10) instead of the approximate value v as previously described. The value k is any suitable proportionality constant and upon examination of Equation 11 it is reasonable to evaluate k as $\tfrac{1}{2}(a_4 a_3/a_2 C)^{1/2}$. With this choice of the value for k it is apparent that read only memory 210 would now contain the numerator of Equation 11. If circuitry is provided to derive the function $T^{1/2}$ from the source of pulses that drives the circuitry in FIG. 10, then the exact velocity determined by Equation 11 can be obtained. One embodiment of such a circuit is illustrated in FIG. 14.

Referring to FIG. 14, upon actuation of switch 151 or alternatively enabling the circuitry shown in FIG. 11, a counter 221 driven by clock 150 begins counting clock pulses when enabled by an input from terminal 161 (FIG. 10). An input from terminal 161 also enables a counter 222 to begin counting input pulses provided by signal line 48 (FIG. 2). The respective counts $n_1$ and $n_2$ are input to a read only memory 223 and comprise the addresses to read only memory 223 which stores the value of $T^{1/2}$. The value of $T^{1/2}$ is output on signal lines 216 to a read only memory 214. The value of kT' is output from read only memory 210 to the input of read only memory 214. The value of the output of read only memory 210 is that stored at the address selected by the $m_2$ and $m_1$ counts from counters 200 and 205 as previously described. The inputs to read only memory 214 comprise the address of the corresponding exact velocity v. The output of read only memory 214 is applied via signal lines 211, 212 and 213 to decoder drivers 215, 220 and 225. The outputs of drivers 215, 220 and 225 are applied along signal lines 226, 228 and 229 to display 50. An enable signal is obtained from inverter 173 as previously described to inhibit output from read only memory 210 and read only memory 214, to prevent cycling of display 50 while counters are accumulating.

Whether or not exact or approximate velocity is obtained by the circuitry of the present invention, it is clear that the sensed and measured velocity may be interpreted as a relative velocity. This would be the case, for example, if the detection and signaling system were utilized in a commercial aircraft as a warning device. A readout from the system of 1200 miles per hour on one aircraft would indicate that a nearby light source on another aircraft was closing at 550 miles per hour given that the air speed of the first aircraft was 650 miles per hour.

Since the present invention has been disclosed for making real time function translations using a series of appropriately connected read only memories any modification of the relationship between velocity and sensed input pulses made necessary by the use of light gathering devices such as lenses may be accommodated by programming of the read only memories. This accommodation can be utilized if a lens system were used to limit the look angle of the detection and signaling system to isolate one perceived source from another in the area. Such a telescopic type lens system would also have the effect of increasing the range of the system.

In the present system, it is important to note that the sensed variation in light intensity need not represent relative velocity between the source and the detection and signaling system. The system is capable of detecting variations in light intensity at a source at a distance from the system. Therefore, the system has application to fire detection in circumstances where fire causes a sensed variation in light intensity by the system. Event detection is also possible where the event is characterized by a sudden change in light level. The system output in these latter applications would have units other than velocity.

The detection portion of the present invention may also find application wherein it is desired to mark the location of a driveway or construction site which is hard to see at night. In this case, a structure similar to that previously described in FIG. 6 is placed near or mounted on the object to be marked such as a barricade. As a vehicle with lights approaches the marked location, the operator of the motor vehicle detects a visual flashing light to indicate the location of the barricade. The system will first begin to emit flashes at a given rate as the incident light from the motor vehicle becomes great enough to activate the system. Next, the flash rate progressively increases as the motor vehicle continues to approach the barricade. This increase in flashing rate indicates approaching danger to the driver of the vehicle. The flashing rate finally reaches a maximum as determined by the resistance and capacitance values of the system. This flashing light, along with the change in rate of flashing, attracts the attention of the driver of the motor vehicle and can prevent accidents and the like.

The effective control of flashing signals may be further enhanced by choice of ratios of sensitive areas of the photosensitive surfaces 34 and 42. For example, in some applications a small sensitive area of surface 42 relative to area 34 may be used to offset the usually greater intensity of sunlight as compared to light from artificial sources. Further, the effective area of arrangement of surface 42 may be made to approach zero by using a suitable cover or by recessing the arrangement inside a cylinder as shown in FIG. 9 to even greater depths to achieve a smaller viewing aperture. In some cases the position of the surface 42 may be reduced sufficiently such that the system may be made to operate in high ambient light conditions such as full sunlight, if desired. Similarly, in some applications the omnidirectional characteristic of surface 34 may be modified by covering selected viewing angles of the device.

Further, the photosensitive surfaces 34 and 42 may be formed from different types of materials and may comprise photoresistors. Since tungsten sources are relatively lower color temperature sources, the surface 34 may be made of CdSe, which is a photoconductive bulk effect material responsive to lower color temperatures. The second surface 42 may be selected and filtered to be responsive to another part of the light spectrum. This effect would be to render the system more responsive to vehicular lights in varying levels of ambient light than would be the case if no spectral discrimination is employed.

It may thus be seen that the present invention improves the visibility of moving vehicles, pedestrians and fixed objects in the vicinity of highways in addition to providing velocity measurements. The present system enhances the safety feature provided thereby due to the automatic operation to avoid operator negligence in turning on the device at low light environments. The efficiency of converting electrical power into visible light signals is enhanced by the pulse control of the light emitting device of the invention. The present photosensitive surfaces used to detect motor vehicle headlights provide 360° coverage in the horizontal plane, thereby eliminating any "blind spots". While the present invention has been particularly described as being mounted on two wheeled vehicles such as bicycles and motorbikes, it will be understood that the present invention may also be utilized to indicate the presence of fixed objects such as driveway entrances, bridge railings, approach or termination ends of an aircraft runway, parking lot entrances, or exits, excavation sites, manholes, road construction areas or the like. Additionally, the velocity measurement or motion detection system of the present invention can be utilized in security applications for the detection of motion and presence of objects.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A system for detecting and displaying the velocity of a localized light source having an intensity located at a distance from the system and moving with respect to the system comprising:
   a housing having a vertical axis;
   light sensing means disposed within said housing for detecting the intensity of the light from the localized light source at any direction in a horizontal plane perpendicular to said vertical axis and for generating a signal representing sensed light intensity of the localized light source;
   circuit means responsive to said signal generated by said light sensing means for generating an output signal representative of the velocity of the localized light source moving with respect to said housing; and
   means interconnected to said circuit means for displaying said output signal to provide an indication of the velocity of the localized light source moving with respect to said housing.

2. The system of claim 1 and further including:
   means for establishing a reference velocity value; and
   means for comparing the velocity of the localized light source moving with respect to said housing to said reference velocity value, such that said circuit means is actuated when the velocity of the localized light source moving with respect to said housing exceeds said reference velocity value.

3. The system of claim 1 wherein said means for displaying said output signal includes at least one light emitting device.

4. The system of claim 3 wherein said light emitting device is disposed within a reflective translucent housing.

5. The system of claim 3 wherein said light sensing means includes:
   a first photosensitive surface having a configuration responsive to the intensity of the localized light source emanating from any point in a horizontal plane perpendicular to the axis of said housing;

a second photosensitive surface disposed to receive largely ambient light and to be nonresponsive to the intensity of the localized light source in said horizontal plane; and means for controlling said light emitting device in response to the light incident on said first and second photosensitive surfaces, such that said light emitting device is selectively illuminated when said first photosensitive surface detects the intensity of the localized light source and said second photosensitive surface detects the absence of a predetermined level of ambient light.

6. The detecting and signaling system of claim 5 wherein said first photosensitive surface has a cylindrical configuration and is oriented with its axis in a vertical position to detect localized incident light sources in a 360° arc in the horizontal plane.

7. The system of claim 5 wherein said means for controlling said light emitting device causes said light emitting device to flash on and off.

8. The system of claim 7 wherein said means for controlling said light emitting device increases the time rate of flash of said light emitting device in response to a decreasing function of the distance between said housing and the localized light source.

9. The system of claim 1 wherein said circuit means includes read only memory devices for generating light variation function output signals.

10. The detecting and signaling system of claim 1 and further including an optical telescopic device for receiving light from the incident light source prior to detection by said circuit means.

11. A system for detecting and displaying an indication of movement between the system and a fixed localized light source having an intensity located at a distance from the system comprising:

a housing having a vertical axis;

light sensing means disposed within said housing for detecting the intensity of the light from the localized light source at any position in a horizontal plane perpendicular to said vertical axis and for generating a signal representing sensed light intensity;

circuit means responsive to said signal generated by said light sensing means for generating an output signal representative of movement of said housing; and means interconnected to said circuit means for displaying said output signal to provide an indication of movement between the localized light source and said housing.

12. The system of claim 11 and further including:

a first photosensitive surface having a configuration responsive to the intensity of the localized light source emanating from any point in a horizontal plane perpendicular to the axis of said housing;

a second photosensitive surface disposed to receive largely ambient light and to be nonresponsive to the intensity of the localized light source in said horizontal plane; and means for controlling said display means in response to said light incident on said first and second photosensitive surfaces, such that said display means is selectively activated when said first photosensitive surface detects the intensity of the localized light source and said second photosensitive surface detects the absence of a predetermined level of ambient light.

13. A system for sensing and measuring a variation in light level of a light source having an intensity located at a distance from the system comprising:

a housing having a vertical axis;

first circuit means disposed within said housing for photosensitive detection of variations in the light intensity at any direction in a horizontal plane perpendicular to said vertical axis of the light source and for generating a signal representative of the incident light on the system;

second circuit means for measuring variations in said signal generated by first circuit means as a function of time and for generating an output signal; and means interconnected to said second circuit means for displaying said output signal generated by said second circuit means to provide an indication of variations in the intensity of the light source as a function of time.

14. The system of claim 13 wherein said second circuit means includes read only memory devices for generating light variation function output signals.

15. The system of claim 13 wherein said signal representative of the incident light on the system comprises an audible signal.

16. The detecting and signaling system of claim 15 and further including means for generating said audible signal, wherein said display means and said means for generating said audible signal are located at a remote location from said first and second circuit means.

17. The system of claim 13 and further including:

third circuit means for activating said second circuit means when said signal generated by said first circuit means exceeds a predetermined value varying with time.

18. The system of claim 17 wherein said first circuit means includes:

a first photosensitive detector disposed within said housing to receive incident light from the light source in a horizontal plane;

a second photosensitive detector disposed within said housing to receive largely ambient light; and said first photosensitive detector in response to the incident light generating said signal representative of the light incident on the system when a predetermined dark ambient light level is sensed by said second photosensitive detector.

19. The system of claim 18 wherein said photosensitive detectors comprise photoresistors.

20. The system of claim 13 wherein said display means includes at least one light emitting device.

21. A detecting and signaling system comprising:

a housing;

a first photosensitive surface disposed within said housing and having a configuration responsive to the intensity of localized light sources emanating from any point in a horizontal plane surrounding said first photosensitive surface;

a second photosensitive surface disposed within said housing to receive largely ambient light and to be nonresponsive to localized light sources in said horizontal plane;

at least one light emitting device;

circuit means for controlling the output of said light emitting device in response to said light incident on said first and second photosensitive surfaces, such that said light emitting device is selectively illuminated to flash on and off when said first photosensitive surface detects a localized light source and said second photosensitive surface detects the absence of a predetermined level of ambient light;

means for detecting the rate of flashing of said light emitting device; and means for computing an approximation of the speed of the localized light source with respect to said housing in response to said detected rate of flashing of said light emitting device.

22. The detecting and signaling system of claim 21 wherein said first photosensitive surface has a cylindrical configuration and is oriented with its axis in a vertical position to detect localized light sources in a 360° arc in the horizontal plane.

23. The detecting and signaling system of claim 21 wherein said circuit means increases the time rate of flash of said light emitting device in response to a decreasing function of the distance between said housing and the detected localized light source.

24. The detecting and signaling system of claim 24 wherein said function comprises the rate of change of said distance.

25. The detecting and signaling system of claim 21 and further including:

means for obscuring light from reaching selected portions of said second photosensitive surface for enabling illumination of said light emitting device in high ambient light conditions.

26. The detecting and signaling system of claim 21 wherein said photosensitive surfaces are responsive to different frequency spectrums.

27. The detecting and signaling system of claim 21 wherein said first photosensitive surface is disposed within a transparent lens configuration.

28. The detecting and signaling system of claim 27 wherein said lens configuration has a pyramidal shape.

29. The detecting and signaling system of claim 27 wherein said lens configuration has a spherical shape.

30. The detecting and signaling system of claim 21 wherein said light emitting device is located remotely from said circuit means.

31. The detecting and signaling system of claim 21 wherein said photosensitive surfaces comprise photoresistors.

32. The detecting and signaling system of claim 21 wherein said circuit means further includes a position dependent switch for actuating and deactuating the system.

33. The detecting and signaling system of claim 21 wherein the instantaneous voltage applied to said light emitting device is greater than the rated voltage of said light emitting device.

34. The detecting and signaling system of claim 21 wherein said first photosensitive surface includes at least two side walls disposed around a vertical axis perpendicular to the horizontal plane, each oriented to detect light from a sector of the horizontal plane surrounding said first photosensitive surface.

35. The detecting and signaling system of claim 34 wherein said first photosensitive surface is disposed within a transparent lens configuration.

* * * * *